No. 715,631. Patented Dec. 9, 1902.
H. B. AYRES.
METHOD OF REMOVING CORES FROM TREE TRUNKS.
(Application filed June 10, 1902.)
(No Model.)
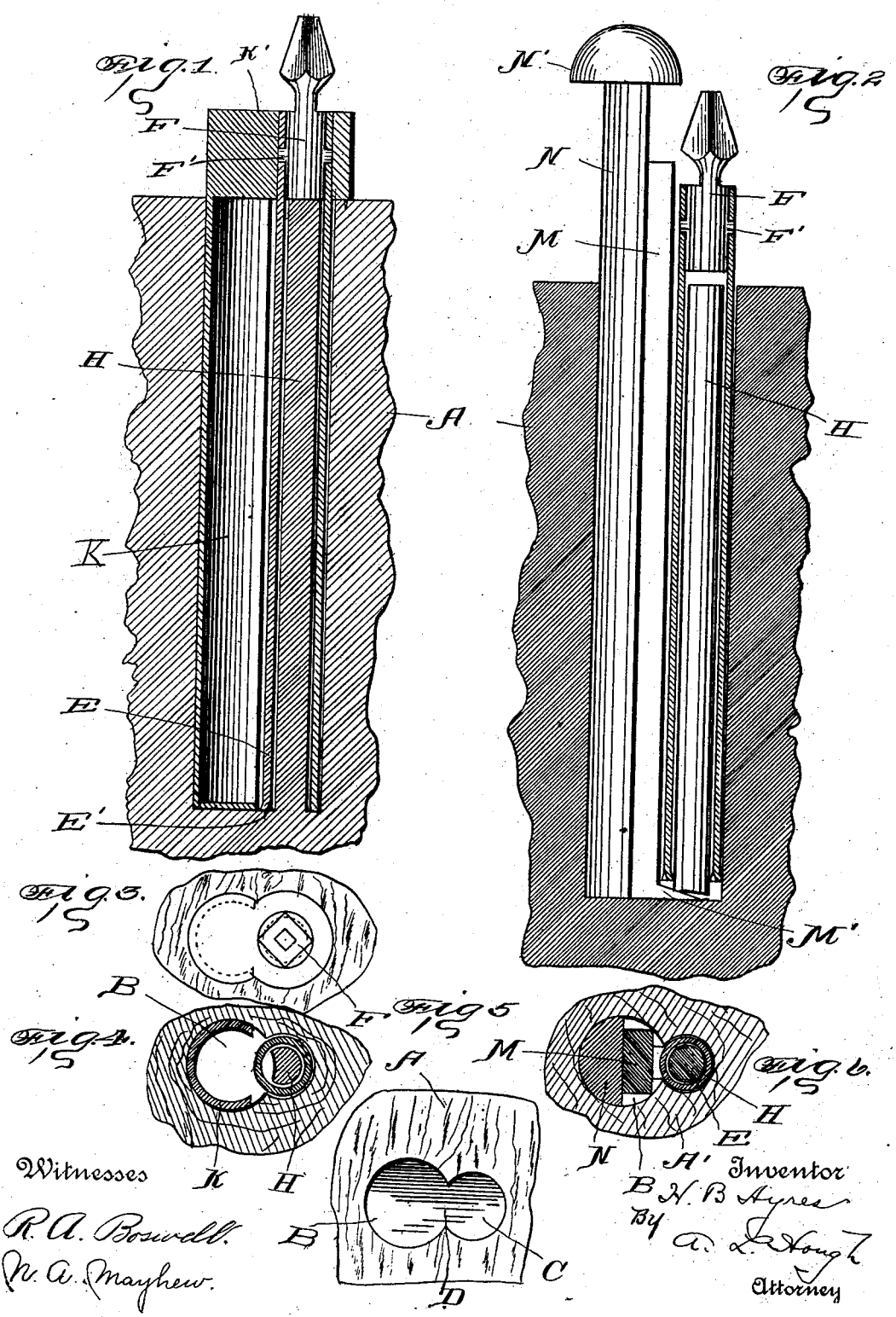

UNITED STATES PATENT OFFICE.

HORACE B. AYRES, OF ALLAMUCHY, NEW JERSEY.

METHOD OF REMOVING CORES FROM TREE-TRUNKS.

SPECIFICATION forming part of Letters Patent No. 715,631, dated December 9, 1902.

Application filed June 10, 1902. Serial No. 110,981. (No model.)

*To all whom it may concern:*

Be it known that I, HORACE B. AYRES, a citizen of the United States, residing at Allamuchy, in the county of Warren, State of New Jersey, have invented certain new and useful Improvements in Methods of Removing Solid Cores from the Trunks of Trees; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a new and useful method of removing a solid core from the body of a tree for the purpose of determining the age of a tree by counting the annual rings, which will indicate the age thereof, and which consists in forming a bore into the body of a tree and afterward cutting a core by the use of a hollow auger or saw, which is inserted into the body of the tree at a location adjacent to the bore, which has been formed so that the boring of the hollow auger or saw will intersect the cylindrical outlined wall of the bore previously made in the tree, thus forming a channel through which the sawdust or shavings from the boring of the hollow auger are allowed to fall and from which they are withdrawn by suitable means and afterward the core severed from the tree and withdrawn with the hollow auger.

The invention consists, further, in various steps of the method whereby a solid core may be removed from a tree and which may be accomplished by means of an apparatus which I have illustrated in the drawings forming a part of this application, in which drawings similar letters of reference indicate like parts in the several views, in which—

Figure 1 is a vertical sectional view through a portion of the body of a tree and tools, showing the manner in which a core is formed. Fig. 2 is a similar view through the body portion of a tree, the boring-tools, and means for severing the core from the tree, whereby it may be removed with the hollow auger. Fig. 3 is a plan view looking at the end of the apparatus held within the bores in a tree. Fig. 4 is a vertical cross-section through the boring-tool, a section of the tree, the solid core, and the apparatus for removing the shavings or sawdust. Fig. 5 is a plan view looking at the two bores formed in the tree for the purpose of removing the solid core; and Fig. 6 is a cross-sectional view through Fig. 2, showing the tools applied for severing the core.

Reference now being had to the details of the drawings by letter, A designates a section of the trunk of a tree which first has formed therein a hole B, made by means of an ordinary auger, which is the first step in my improved method of removing a solid core from the trunk of a tree. After this bore has been formed a tool-supporting device K' is employed which has a trough-shaped extension K, which comprises a segment of a cylinder of such shape as to readily enter the bore B of a tree, which bore has been previously formed. Said tool-supporting device has a bearing aperture to receive the outer end of the hollow auger or saw E, as clearly shown in Fig. 1 of the drawings. Said hollow auger or saw E is of the ordinary construction, having cutting-teeth E' at one end, while at its opposite end are provided apertures with slots leading thereto from the end of the auger, in which the lugs F', integral with the shank F, adapted for connection with a bit-brace, are inserted to enter diametrically opposite apertures in the wall of the hollow auger, whereby the latter may be rotated. The auger is held in such a position in the tool-supporting device K' that the hole formed by the hollow boring-auger will intersect the wall of the bore B, leaving a channel between said bore B and the hole formed by the boring of the hollow auger for the purpose of allowing the sawdust or shavings from the hollow auger to fall through a channel thus formed and to be caught by the semicylindrical trough-shaped extension K, as clearly illustrated in Fig. 4 of the drawings. As the hollow auger cuts into the tree it will be observed that a solid core H is formed of substantially cylindrical shape, which may have a slight concaved channel on its lower edge, and the shavings or sawdust will readily fall by gravity out of the path of the auger.

When it is desired to sever the solid core from the tree, the auger-carrying tool is removed from the bore in the tree and a tool M having an angled wedge-shaped end M' is inserted in the bore B of the tree the depth of said bore, and a member N, with a suitable handle N', is inserted between the under edge of said severing member M and the lower portion of the bore B, and the wedge-shaped cutting end M' may be forced through the inner part of the solid core, thus severing the same from the body of the tree in the manner illustrated in Fig. 2 of the drawings. After the core has been severed it may be removed from the tree with the hollow auger, and by detaching the shank portion F of the auger the core may be easily driven out of the auger. By reason of the grain of the tree being crosswise of the bore it will be readily seen that the core may be easily severed in the manner described. After the core has been removed by counting the number of annual rings extending its length, each one representing a year's growth with timbers in regions where there are marked changes in the seasons, which comprises the majority of woods of temperate zones, the age of the tree may be readily determined.

While I have shown a particular kind of apparatus whereby my method of removing a core from a tree may be accomplished, still it will be at once apparent that various other tools may be employed whereby the same result may be accomplished.

Having thus fully described my invention, what I claim as new, and desire to secure by Letters Patent, is—

1. A method of cutting a solid core in the trunk of a tree to determine by the annual rings on the core the age of the tree, consisting first in forming a hollow bore in the trunk of the tree, and adjacent thereto a second bore with a solid core with the walls of the two bores intersecting forming a channel for the exit of the borings of the auger with the solid core, as set forth.

2. A method of cutting a solid core in the trunk of a tree to determine by the annual rings on the core the age of the tree, consisting in first forming a bore in the tree and afterward cutting a solid core by means of a hollow auger, the hole formed by which auger intersects the wall of the bore first formed, thus forming a channel through which the sawdust and cuttings may fall by gravity, and afterward severing and removing the core from the tree, as set forth.

3. A method of cutting a solid core in the trunk of a tree to determine by the annual rings on the core the age of the tree, consisting in forming a bore into the trunk of a tree, and afterward boring a hole into the tree by means of a hollow auger at such a location that the hole thus formed will cut through the wall of said bore, leaving a channel through which the sawdust or cuttings from the cutting-auger may fall, and are removed from the bore previous to the severing and removing of the core and auger, as set forth.

4. A method of cutting a solid core in the trunk of a tree to determine by the annual rings on the core the age of the tree, consisting in first forming a bore into the trunk of a tree, and afterward forming a hole by means of a hollow auger positioned adjacent to the bore at such a location that the wall of said bore and hole each intersect, forming a channel through which the sawdust from the cutting-auger is allowed to fall and afterward severing the core at its inner end from the body of a tree after the sawdust has been removed and removing the core with a hollow auger, as set forth.

In testimony whereof I hereunto affix my signature in presence of two witnesses.

HORACE B. AYRES.

Witnesses:
A. L. HOUGH,
N. A. MAYHEW.